Oct. 13, 1970     G. L. CLARK ET AL     3,534,289
LASER SYSTEM WITH OPTICAL DISCRIMINATOR
Filed Feb. 6, 1967                              2 Sheets-Sheet 1
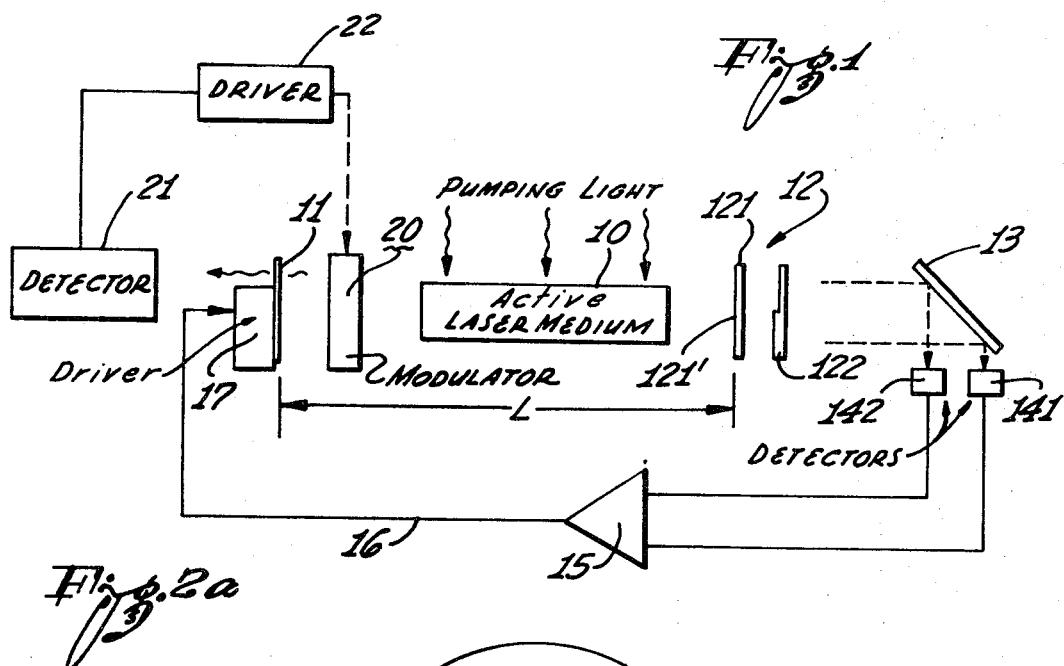
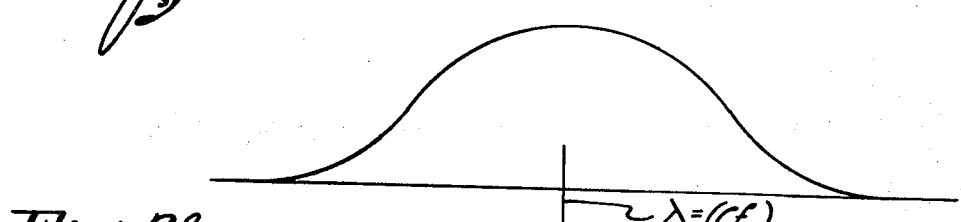
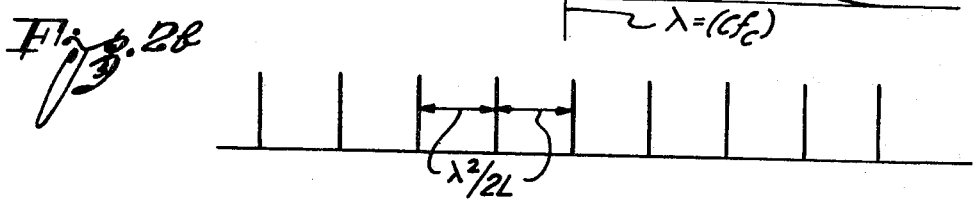
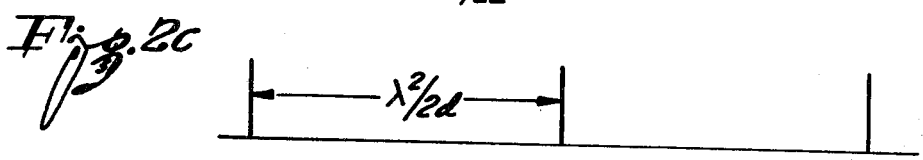
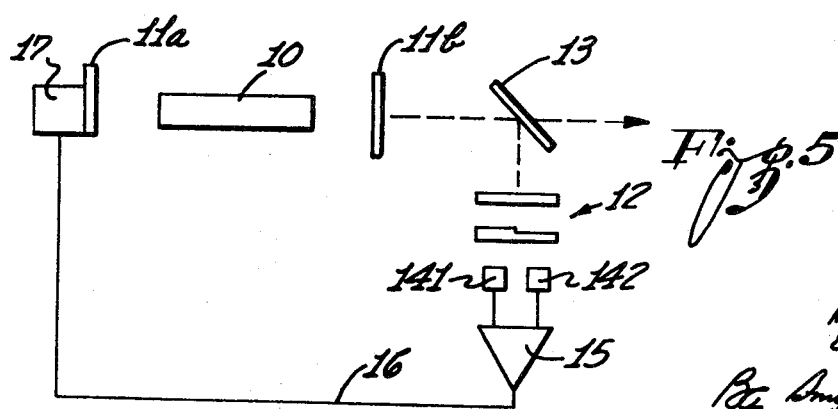
INVENTORS
GEORGE L. CLARK
MORRIS KATZMAN
ELLIS D. HARRIS
ATTORNEYS

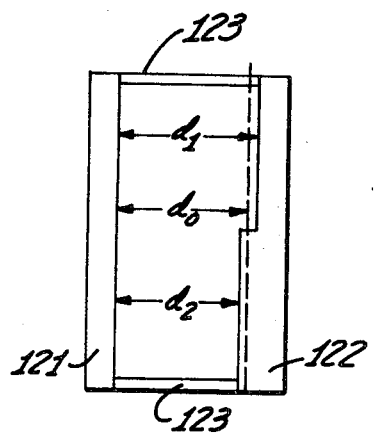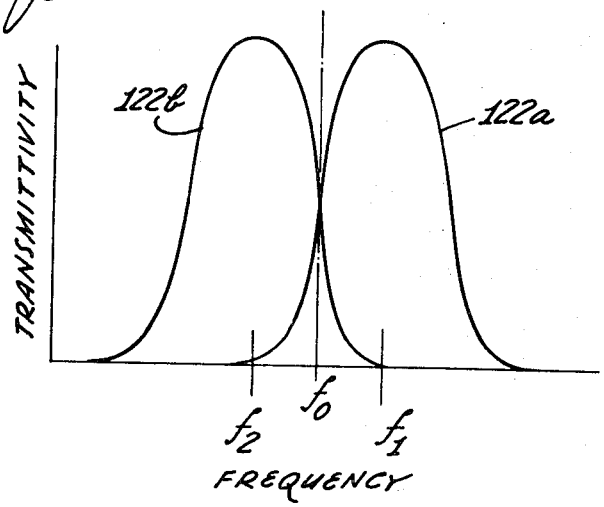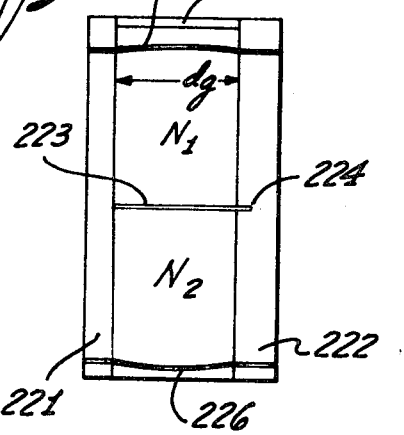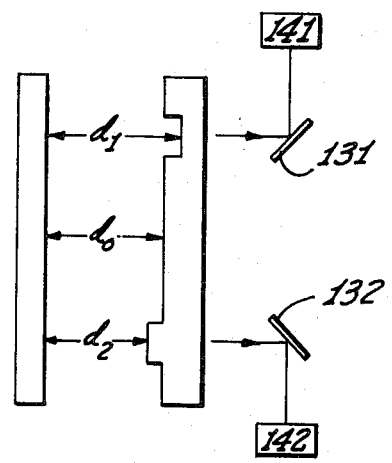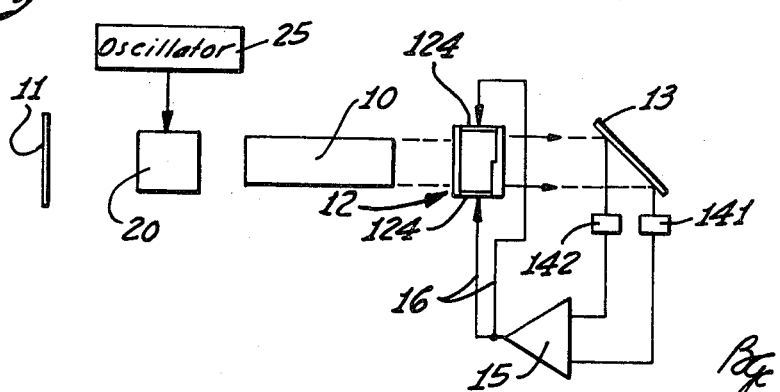

United States Patent Office 3,534,289
Patented Oct. 13, 1970

3,534,289
LASER SYSTEM WITH OPTICAL DISCRIMINATOR
George L. Clark and Morris Katzman, Sierra Madre, and Ellis D. Harris, Bradbury, Calif., assignors, by mesne assignments, to Xerox Corporation, a corporation of New York
Filed Feb. 6, 1967, Ser. No. 614,261
Int. Cl. H01s 3/10
U.S. Cl. 331—94.5                                                11 Claims

ABSTRACT OF THE DISCLOSURE

A split Fabry-Perot etalon is used to couple out a single mode from a laser for purposes of control of the relative frequency position between that mode and two split modes of the etalon. The laser is preferably mode-locked. The control involves either the laser spacing or or the etalon spacing.

---

The present invention relates to an optical discrimitor for highly monochromatic radiation such as it exists in a single mode output of a laser beam. A laser cavity is usually comprised of an optically pumped, active material positioned in relation to a pair of reflectors, whereby the term, active, characterizes the material as one having a fluorescent line corresponding to a transition between electron energy levels for which at least temporarily a nonequilibrium population can be maintained so that substantial quantities of transitions can be stimulated.

Upon using a particular fluorescent line for laser operations such a cavity establishes a plurality of modes which all are integral multiples of and are spaced apart by the longitudinal, intracavity fundamental defined by $C/2L$ with C being the velocity of light and L being the optical length in between the two reflectors. The period $C/2L$ is the complete "round trip" time for a photon in the cavity. Should for reasons of acoustic or thermal vibrations the length of the laser cavity change, the modes will correspondingly follow that change. The laser can be mode-locked by modulating the laser beam at a frequency equal to the cavity fundamental. If the modulator is driven from an external frequency standard, then the spacing of the modes will be equal to that external frequency even if that frequency differs slightly from the cavity fundamental. One method of stabilizing a laser when operated in such a mode-locked configuration is disclosed in the copending application of one of us and having common assignee, Ser. No. 590,336, filed Oct. 28, 1966.

Mode locking is an effective means for operating a laser efficiently, because it parametrically couples the modes together. If a so-called Fabry-Perot etalon is used as one of the reflectors to couple out a single mode the power in all modes coupled together is utilized. Here then two related problems arise.

If the laser is mode-locked and stabilized to an external frequency standard, effective operation, particularly of coupling out a single mode by means of a Fabry-Perot etalon, requires that one of the usually rather narrow transmission bands of the etalon coincides with the laser mode to be coupled out. Should the etalon spacing vary then, relatively speaking, the laser mode frequency to be coupled out will drift away and out of the range of the transmission band of the etalon, due to variations in spacing of the etalon. If the laser is mode-locked but not stabilized to an external frequency standard, then variations in the laser length cavity will cause additional drift as between the mode to be coupled out and the transmission of the Fabry-Perot etalon transmission band used. If the laser is neither mode-locked nor stabilized, the etalon cannot be used to couple out a single mode from the laser cavity directly, but the etalon can still be used to filter out a single mode from the multi-mode laser beam external to the laser cavity. Any drift of this mode, and, therefore, of all modes can thus be detected.

The invention now provides an effective tool which permits these deficiencies of laser operations to be obviated. The principal device envisioned here is a split Fabry-Perot etalon having, for example, two different optical spacings as between the two principal reflecting surfaces defining the etalon, to establish split transmission modes at least one thereof being defined by two neighboring, overlapping transmission bands.

The two different etalon spacings can be established optically or geometrically. If the medium in the spacing of the etalon has the same index of refraction throughout, then the etalon will be comprised of a first semireflecting surface, preferably positioned to also define one reflector for the laser cavity. The other semireflecting surface for the etalon may be provided with a step so that a portion thereof is nearer to the first mentioned semireflecting surface of the etalon than the other or a remaining portion of the second semireflecting surface of the etalon.

Alternatively the etalon may be defined by two equidistantly-spaced semireflecting surfaces, but a first portion of the space in between is filled with a transparent medium having an index of refraction which differs from the index of refraction of the medium, with which the remaining portion of the etalon space is filled, so that in effect the optical distances between the two etalon surfaces differ in the two portions.

The two etalon transmission bands are now, in addition, defined so that one of the laser modes is in about the center between the spaces of the two transmission bands. Means are provided to maintain this relationship between laser mode and the two etalon transmission bands. The light permitted to pass through the two portions of the etalon is detected separately, and if the condition given is fulfilled then the two detectors will monitor similar amounts of light. Electrical signals as provided by the two detectors can be used for the formation of an error signal, and to provide zero output whenever the desired relationship is present.

Should for any reason a shift occur between the split etalon transmission band and the mode to be coupled out by the etalon, one of the two detectors will monitor more light than the respective other one. The direction of this relative frequency shift can directly be derived from the identity of the detector which receives more light. In the error signal formation network there will now be produced an error signal which can be used for control purposes. The control may affect either the etalon spacing or the laser cavity spacing, whereby in the former case the split transmission bands are in effect shifted relative to the laser mode frequency coupled out, while in the latter case, the laser mode may be shifted relative to the split transmission band of the etalon. Which one of the control modes is being used will depend on the operating circumstances of the laser.

If the laser, for example, is mode-locked and stabilized to an external frequency standard, then one will change the etalon spacing, because a deviation from the desired relationship will then usually be due to disturbances in the etalon. Such a deviation may, however, also occur due to variations in the external frequency standard, but by controlling the etalon spacing the etalon will track the mode to which its split transmission band is centered.

One will use the error signal for control of the laser cavity length if the laser is either not mode-locked at all, or if it is mode-locked to the existing laser length spacing and not to an external frequency standard. If the laser is not mode-locked at all, then the etalon must be external to the cavity; if the laser is mode-locked to the existing laser length spacing the etalon may be one of the reflectors which define the laser cavity. In either one of these two cases the etalon serves as a frequency standard, and the laser is controlled so that the particular mode to be coupled out has a frequency in the mid point between the peaks of the split etalon transmission bands. A similar situation for control exists if the source for the monochromatic radiation is not a laser, but where the frequency of such a radiation is susceptible to a controlled change by controlling a characteristic of the source.

It is of great convenience, that the optical discriminator as described can serve as laser output coupler as well as tap for providing the input in a control loop. However, this dual role is not mandatory. If however, the etalon is used in this dual function, it may be advisable to tri-part the etalon so that the major portion has a spacing corresponding to a transmission band coinciding as much as possible with the laser mode to be coupled out. The two additional transmission bands of the etalon are then exclusively used for control purposes and should have an aperture just sufficient to provide an input for the detectors above a desirable signal-to-noise ratio level.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings, in which:

FIG. 1 illustrates somewhat schematically a block diagram for a mode-locked laser with a Fabry-Perot etalon coupled together and a control loop for laser stabilization in accordance with a first embodiment of the present invention;

FIGS. 2A, 2B and 2C illustrate pertinent characteristics of the system shown in FIG. 1;

FIG. 3 illustrates somewhat schematically an enlarged side view of the Fabry-Perot etalon used as optical discriminator in the embodiment shown in FIG. 1;

FIG. 4 is a graph illustrating the transmission characteristics of the etalon shown in FIG. 3 and in which the relative intensity of transmitted radiation is plotted versus frequency;

FIG. 5 illustrates a modification of the system shown in FIG. 1 without mode-locking;

FIG. 6 illustrates a modified control loop for a laser mode-locked to an external frequency standard and with a controlled etalon output coupler; and FIGS. 7 and 8 illustrate side views, somewhat schematically, of modified Fabry-Perot etalons, likewise suitable for use as output coupler as well as optical discriminator.

Proceeding now to the detailed description of the drawings: In FIG. 1 thereof there is shown a column, rod or cavity of active laser material or medium 10 being of any suitable kind. Without intending to restrict the invention and the mode of practicing the invention, it may be assumed that the laser material is neodymium doped YAG (yttrium aluminum garnet).

The laser has a first reflecting mirror 11 positioned adjacent to one end of the active material 10. A second reflector 12 is positioned at the other end of the laser material 10 in order to complete the optical laser cavity in longitudinal direction to the extension of the laser material 10.

This second reflector is established by a Fabry-Perot etalon 12 comprised of two transparent plates 121 and 122, the surfaces thereof facing each other bearing thin metallic semitransparent or dielectric coatings to establish semitransparent reflecting surfaces. Light enters the etalon 12 through plate 121. Depending on the characteristics of the etalon some light will be transmitted through plate 122 and some light will be reflected by the etalon in the laser cavity. That reflection is essential for the laser operation particularly as far as the sustaining of oscillations is concerned.

This reflecting plane $121'$ of the reflecting surface of plate 121 defines the length L of the laser cavity together with the effective reflector surface of the mirror 11. Before proceeding with the description of the etalon, several aspects of the laser cavity shall be considered.

FIG. 2A now illustrates the emission line width of a fluorescent spectrum line of the material 10 and having a center frequency $f_c$. That line is used for laser operation. For example, the line may have the frequency $f_c$ of 1.0648 microns resulting from a level transition 11502 $cm.^{-1}$ to 2111 $cm.^{-1}$ and found suitable for laser operation of the above-mentioned YAG:Nd material.

The characteristics of FIG. 2A can also be described as the gain curve for individual laser modes within the frequency range as defined hereby the width of the fluorescent line. The length L of the laser cavity is chosen so that at least one integral multiple of the cavity fundamental $C/2L$ falls into the range covered by the gain curve or frequency characteristics of the line. In practice, and for cavity lengths in the centimeter range and above, a large number of such modes may fall in such a range, because the intermode spacing, which of course is also given by the value $C/2L$ is smaller by one or more orders of magnitude than the line width of a spectrum line for example in the visible spectrum range. Thus, there will exist a number of modes which can be sustained and that number depends on the ratio of the line width and the intramode spacing or cavity fundamental $C/2L$.

To give an example, for a cavity length L of 9 cm. the intracavity frequency $C/2L$ is 1.67 gc. The above-mentioned spectrum line has a width of above 135 gc. so that approximately 80 modes can be sustained theoretically in such a cavity. Of course, it has to be observed that the modes in the outer regions of the gain curve have very little power when compared with the center modes. Moreover, how many modes one can actually sustain depends on the "pumping" power applied to the laser cavity. The theshold level for sustaining any mode in the laser cavity depends on the gain of that mode given by the gain curve. If the pumping power is below that threshold, then the mode cannot be sustained. Thus, for relatively low pumping power levels one or only a few modes can be sustained. It is impractical to apply such a high pumping power to a laser that more than about half the threshold modes are actually sustained. In the example above, 20 modes is a reasonable number of modes to be sustained.

Without further measures these modes are more or less unrelated to each other particularly as far as phase is concerned. The molecular structure of the laser material, particularly of the host, may provide some interaction among the excited atoms, which aspect however is not important as far as the present invention is concerned. It is now known however that by modulating, for example, by phase or loss modulating the laser beam in the cavity at the intracavity frequency the modes can be locked together and can be made side bands in relation to each other. Upon such modulations these modes are parametrically coupled with each other. The coupling particularly of amplitudes and phases of all these axial modes is so strong that even if a single mode is coupled out to an extent that it could not be sustained by itself, it still can be sustained in the cavity due to the coupling effect.

Modulation can be provided by any suitable and known means including electro-optical, magneto-optic and elasto-optic effects and others. As schematically illustrated in FIG. 1, the block 20 may denote such a modulator.

At first, i.e., for purposes of describing the first embodiment, it shall be assumed that the modulator is not driven from a frequency standard. Instead, the modulator 20 may for example be a so-called bleaching cell in which a saturable light absorber blocks the passage of light by absorption, but "opens" passage when absorption has reached the saturation, the cell thereafter recovers to block again, etc. The nature of such a cell provides loss modulation at a rate corresponding to the roundtrip time of light via the cavity, i.e., at the cavity fundamental as it exists at any instant. Thus, the laser will be mode locked to its own intermode space $C/2L$.

The principal element of the present invention is the output coupler, i.e., the Fabry-Perot etalon 12 presently considered primarily for purposes of control. A Fabry-Perot etalon has a high reflectivity effective for reflecting back into the laser cavity and in a longitudinal direction radiation of all frequencies, except of a plurality of narrow transmission bands respectively pertaining to discrete frequency values. For these the etalon is transmissive and they are also denoted as etalon modes.

In particular, if $d$ is the etalon spacing in general, then for values $$d = (2n-1)\frac{\lambda}{4}$$

the etalon is transmissive, where $\lambda$ is the wavelength of the incident light, and $n$ is a positive integer. The formula can be rewritten as $\lambda = 4d/(2n-1)$, which for a given value for $d$ defines a plurality of wavelengths which are the transmission modes (in wavelengths) of the etalon. These modes are apart by a mode spacing given by the incremental frequency value $C/2d$, or in wavelength $\lambda^2/2d$.

By selecting one of the etalon modes to coincide with one of the laser modes, that mode can be coupled out; provided the following rules are observed. First the etalon mode chosen has a transmission band width smaller than the laser mode spacing, so that not more than that one laser mode can fall in the etalon trasnmission band. Second, the etalon mode pacing $C/2d$ must be equal to or larger than half the line width, or larger than half the number of laser cavity modes in the line times the laser mode spacing. Upon observing this rule no more than a single one of the laser modes can be coupled out. The relationship between line width, laser cavity modes and etalon modes is depicted in FIGS. 2a, 2b and 2c whereby, however, the number of laser modes has been chosen low merely for illustrative purposes.

Up to this point we have considered the etalon 12 in a uniform version disregarding the fact that the particular etalon illustrated in FIG. 1 and illustrated in an enlarged side view in FIG. 3, has not a uniform spacing $d$ as between the two reflecting surfaces facing each other, but the etalon plate 122 is provided with the step so that a split etalon is established with two different spacings respectively denoted $d1$ and $d2$. Each portion of such an etalon has now its own transmission modes, and the particular ones of interest are illustrated in FIG. 4.

The characteristics 122A, for example, in FIG. 4 is the transmission band of one of the modes which pertains to the portion of the etalon having the larger spacing $d_1$, and the characteristics 122B pertains to the portion of the etalon with spacing $d_2$. It follows from the formula $$d = (2n-1)\frac{\lambda}{4}$$

that the etalon portion with the larger spacing $d_1$ has a peak transmission frequency $f_1$ which is somewhat lower than the peak transmission frequency $f_2$ of the etalon portion having the spacing $d_2$. The etalon modes taken individually for each portion are apart, as stated above, by a mode spacings $C/2d_1$ and $C/2d_2$, respectively.

It is now an important aspect that the difference between $d_1$ and $d_2$ be relatively small so that the peak frequencies $f_1$ and $f_2$ of the two transmission bands differ from each other by an incremental value which is very small in relation to any of the mode spacings, $C/2d_1$ or $C/2d_2$. Therefore, it remains meaningful to speak of modes of the split etalon as a whole with the understanding that each mode thereof is actually a split mode and of the type illustrated in FIG. 4, and, therefore includes two modes, one of each etalon portion.

For purposes of the invention, the etalon dimensions are now chosen that a particular laser mode frequency $f_0$ falls in between the two peak frequencies $f_1$ and $f_2$ of this split etalon transmission mode. Either portion of the etalon has its maximum transmittivity at a frequency offset from the selected laser mode frequency, but the transmission band of the etalon must have an overlapping portion, so that some of the radiation of the selected laser mode can pass through either etalon portion. For reasons of symmetry, the laser mode $f_0$ should coincide with the frequency of intersection of the two curves 122A and 122B, in which case the two etalon portions pass equal amounts of radiant energy of that mode.

A mirror 13 reflects the light permitted to pass through the etalon towards two detectors 141 and 142, respectively receiving light which has passed through the two etalon portions having spacings $d1$ and $d2$ respectively. Thus the two detectors are individually responsive to the portions of the etalon output respectively pertaining to the different spacings. If the etalon 12 serves also as the principal output coupler for a laser beam, then the mirror 13 will be semitransparent to reflect only some of the light towards the detectors 141 and 142. In fact, the reflectivity of mirror 13 will be rather low so that only a small portion of the radiation needed to stimulate the detectors above a reasonable signal-to-noise ratio, is branched off the main beam, the bulk of which should be allowed to propagate through mirror 13.

As long as the laser mode frequency $f_0$ coupled out by the etalon 12 is in between the two center frequencies $f_1$ and $f_2$ and coincides with the intersecting point of the characteristics 122A and 122B, the two detectors will receive equal quantities of light. Deviations from this condition can occur in either one of the following two cases.

In one case, the optically effective distance L of the laser between the mirror 11 and the etalon 12 may vary for reasons of thermal changes and acoustical vibrations. Thereupon the particular mode coupled out by the etalon 12 will not have the frequency $f_0$ anymore, but will vary from $f_0$ to the extent the laser cavity length has varied. A shift between laser mode and etalon mode is also possible when the etalon spacing varies, again, for example, due to thermal changes in the mounting elements positioning the two plates 121 and 122 in relation to each other, or due to changes of the gas pressure in the etalon cavity etc.

If the etalon spacing varies, this will affect the optically effective positioning of plates 121 and 122 in relation to each other, which means that the spacing $d_1$ and $d_2$ will vary by substantially the same amounts $\Delta d$ and in the same direction, therefore the etalon modes will vary in frequency, which means that the characteristics 122a and 122b as a whole will shift along the frequency scale and particularly in relation to the frequency $f_0$.

In either one or both of these cases there is thus a resulting relative frequency shift as between the laser mode and the split etalon mode transmission bands and accordingly the detectors 141 and 142 will receive unequal quantities of light. There is a definite relationship, for example, between the direction of this relative shift and the identity of the detector receiving more light than the respective other one. In case the laser length cavity variation is the principal source of disturbance, this information includes the sign of the deviation of the cavity length from the normal or desired value, for which $f_0$ was one of the modes. In case the etalon mode space varies, the identity of the detector receiving more light defines the sign of the deviation of the average etalon spacing from the desired normal.

A differential amplifier 15 responds to the two detector outputs for producing an error signal in an output channel 16. This error signal can now be used in various ways to be discussed in the following. In the embodiment shown in FIG. 1, it is presumed that the etalon spacing remains very constant within the tolerances of the system as desired. For example, the spacer elements 123 are made of Invar, and the etalon spacing can indeed be maintained constant within very close tolerances. Therefore, any error signal produced in the output channel 16 in this case is presumed to result from a deviation in the laser length cavity L from normal, and "normal" means here a value for which $f_0$ is one of the modes and is in particular located half way between the presumed fixed values $f_1$ and $f_2$ of the split etalon transmission mode band.

It is furthermore presumed that the modes are locked by modulation with a frequency equal to the cavity fundamental as it exists in any instant. In this case now, the output signal, i.e., the error signal in channel 16, can be used to drive a piezoelectric transducer 17 serving as mount for the mirror 11 to thereby adjust the length L of the laser cavity in accordance with the error signal until the two detectors 141 and 142 again receive equal amounts of light. Thus, the control is effective in varying the length of the laser cavity to the extent necessary to shift the particular laser mode coupled out by the etalon, back in between the midpoint between the two peak frequencies $f_1$ and $f_2$ of the etalon. Which is another way of saying that the laser modes are maintained at constant frequency values by feedback control using the midpoint frequency of one of the split etalon modes as reference.

It is not necessary that mirror 11 be the driven one. In the alternative, the etalon 12 as a whole could be mounted on an electrically driven element such as piezoelectric transducer 17 as it is immaterial at which one of its ends one controls the length of the laser cavity.

For the control to function properly, certain conditions must be met. It was mentioned above, in general, that for an etalon certain rules have to be observed in order to make sure that only one etalon mode couples out one laser mode. These rules now have to be particularized as to how the etalon dimensions must be chosen so that the two portions together do select only one of the laser modes.

The selected split mode of the etalon, i.e., the band width of the two etalon transmission bands together must at least be smaller than twice the mode spacing of the laser cavity, so that under stable conditions, no more than one laser mode can be transmitted. How much smaller that band width has to be depends on the desired control range. For example, if due to an error resulting from a lasser cavity length variation, the laser mode has shifted to the low frequency end of the transmission band 122b, the next higher laser mode must not have already entered the upper frequency end of the band 122a, as that may stimulate a balance of signals in the detectors. It should be noted here that detectors 141 and 142 respond only to the totality of light respectively incident upon them without distinguishing whether this light stems from different laser modes. Hence, the two etalon transmission bands together must actually have a width smaller than the smallest laser mode spacing itself expected to occur at closed loop conditions.

On the other hand, the combined effective transmission band width of the etalon must not be so narrow that the width of the laser mode is larger, as in this case a relative shift could be measured only when the laser mode begins to leave the transmission band on one of the etalon portions. It is further more advantageous to select the two etalon spacings $d_1$ and $d_2$ so that the transmission bands, i.e., the characteristics 122A and 122B, overlap at the halfpower points.

If one defines the resolution of an etalon portion as the wave length difference between the halfpower points of a single transmission band, the resolution of the two etalon portions together becomes twice that value. The resolution of a single spaced etalon is, furthermore, given by the ratio: mode spacing (S) over the finesse (F) of the etalon (or $S/F$). The resolution of interest here is thus $2S/F$. The mode spacing of an etalon (or of an etalon portion) is given by $\lambda^2/2d$, and the finesse F is determined by $$\frac{\pi\sqrt{R}}{1-R}$$

where R is the reflectance of the material used to establish the reflectors proper on the plates 121 and 122. Thus, the condition that the laser mode spacing $\lambda^2/2L$ must not be smaller than the resolution of the chosen etalon modes $2S/F \leq \lambda^2/2L$ leads to the rules $L = dF$, with $d = (d_1 + d_2)/2$ for this case.

As was already stated above it was necessary further to select the etalon spacings so that its mode spacings (each mode now understood in this split version, as shown in FIG. 4) are apart by at least half the range of wavelengths (or frequencies) covering all those modes actually coupled together under existing pumping conditions. Where pumping is powerful, that range is actually equal to the full line width, and this relationship is shown in FIG. 2C. If less than the maximum theoretical number of modes are actually sustained (due to low pumping power), then the etalon modes can be closer together.

The etalon mode spacing $S = \lambda^2/2d$ must thus be equal to (or larger than) the laser mode spacing $\lambda^2/2L$ times half the number ($N/2$) of laser modes actually sustained in the fluorescent line chosen for laser operation, which leads to the relation $\lambda^2/2d \geq \lambda^2 N/4L$ or $2L = dN$.

Combining these conditions $dN \leq 2L \leq dF$ it follows that the finesse F of the etalon must be chosen to be equal to (or larger than) the number of modes in the line. This in turn gives a rule for the reflectivity R of the etalon surfaces which determines the finesse F. For laser operations with modes in the range $10^1$ to $10^2$, a finesse in that range is readily obtainable with highly reflective material and very flat surfaces.

From the relations defining the transmittivity of etalons in general one defines a half power point of transmittivity, in terms of etalon spacing variation from a spacing of maximum transmittivity, as given by $$\frac{\lambda}{4} \cdot 1/F$$

so that the step in the reflector plate 122 is given by $\lambda/2F$, which for reasons of the conditions outlined in the preceding paragraphs can also be written as, $\lambda/2N$. For a cavity length of about 40 cm. and for the 1.0648 micron line, the number N of laser modes conveniently sustainable is about 40, and one obtains an etalon step of 106 A. Such a step can readily be supplied with dielectric coating techniques.

In accordance with the foregoing it is apparent that the control loop operates to put a laser mode into alignment with the center of a split etalon mode. Due to control of the laser cavity length, the laser modes are maintained in a chosen relative position, wherein the coupled-out mode is centered in between a split etalon mode. It is furthermore apparent that this control operates independently from the fact whether or not the etalon 12 is used to actually couple out that particular mode frequency for purposes of utilization other than the mere control. From this it follows that as a modification of the device shown in FIG. 1, the mirror 11 could instead be semitransparent, with or without frequency selection, to couple one mode or a plurality of modes out of the laser cavity.

The control situations to which the etalon 12 responds and the error signal formed with the aid of the split etalon is also independent from the fact whether or not the laser cavity is operated in mode locked configuration. On the other hand, if a single mode is desired to be coupled out of the laser for utilization, modulation at the intracavity modulation frequency $C/2L$ should be provided by the modulator 20 as stated so that the mode which is coupled out can draw energy from the other modes and this is a very effective way of providing a very narrow band, continuous wave output.

The optical discriminator together with the control loop can thus be operated to tune the laser to a frequency determined by the etalon, provided it has a very accurately defined fixed spacing; the desired frequency $f^0$ determines the average spacing of the split etalon so that the etalon serves by itself as a frequency standard. It may be advisable to render the (average) etalon spacing adjustable, for example magnetostrictively or electrically, so that the etalon spacing can initially be adjustable very accurately, or it can be controlled in dependence upon temperature so that its spacing can rightfully serve as frequency standard.

FIG. 1 includes another modification for the case in which mirror 11 is semitransparent, but not frequency selective. The output beam, which may be rather weak, will be detected by a detector 21, and the resulting signal will inherently include components of the intermode spacing or cavity fundamental $C/2L$. If that signal is separated it can be used to operate a driver circuit 22 which in turn provides an output signal for driving the modulator 20. This modulator 20 will then be a regular loss on phase modulator such as an electro-optical cell or the like. Such modulator will also provide mode locking regardless of any cavity length variations as the modulation will be driven by the cavity fundamental as it exists in any instant. The control loop again stabilizes the laser to the etalon.

The optical discriminator as defined by the split etalon can also be used in a different type of control, provided the laser has been frequency stabilized otherwise, or in case it is desirable to track a particular laser mode regardless of whether or not this laser mode has a constant frequency. If the etalon spacing is subject to change for any reason, then the two transmission bands together may become dislocated in relation to the laser mode to be coupled out. This is particularly so if for single mode operation an etalon is used as output coupler, and if the laser is mode-locked to an external frequency standard.

The principles of the invention can be applied also to laser operations other than in a mode-locked configuration. However, in this case a Fabry-Perot etalon cannot be used as output coupler, because the particular single mode coupled out could not be sustained. In the embodiment shown in FIG. 5 the cavity is established by the reflectors 11a and 11b as they are conventional for laser cavities, and reflector 11b, for example, is semitransparent. The plate 13 is also predominantly transparent, but having some reflectivity to branch some light off the main beam, and it passes same to the etalon 12. A single mode can pass through the etalon and it is used in a feedback loop configuration as aforedescribed.

This embodiment actually points towards the general case according to which the invention finds utility whereever a source for monochromatic radiation is controllable, and the etalon can be used to convert a portion of the monochromatic output into a control signal to be used to stabilize that source. For example, a rubidium vapor lamp emits a very narrow spectrum line and by controlling the pressure of the vapor the frequency of that line can be stabilized.

In the embodiments of FIGS. 1 and 5 the mode frequency actually coupled out could be kept constant only to the extent the intersection of the overlapping transmission bands of the split etalon remained constant, any variations in the frequency of that midpoint has to be tolerated as the control loop causes the mode coupled out to follow any such shift in the intersection should they occur.

As symbolically shown in FIG. 6, an oscillator 25 may provide a constant frequency at least approximately equal to $C/2L$. The etalon 12 is used to couple out the single mode $f_0$, which has been stabilized otherwise, for example, by mode-locking the laser to the oscillator frequency driving the modulator 20. The etalon spacers 124 can now be controlled in dependence upon the error signal still derived through channel 16 from the output of the differential amplifier 15. The relation between the optical signal input and the output of the etalon is the same as aforedescribed, and the control provides for a relative shift between the single laser mode $f_0$ and the split transmission band of the particular etalon mode used.

This control operates properly also, even if the laser is not stabilized. In this case the particular mode coupled out may shift in frequency due to laser cavity instability. The output of the split etalon will still operate the differential amplifier 15 so that the etalon spacing is in turn varied to track the laser mode, so that the latter remains in the midpoint of the two etalon transmission bands and can, therefore, be coupled out successfully. The transmission band of the split etalon will vary by control operation thus permitting the output coupler to track the variable laser mode. The control will operate regardless of the reason for any deviation of the relative position of laser mode and the split etalon mode.

The salient feature of the split etalon is the establishing of two etalon spacings $d_1$ and $d_2$ to thereby set up the split transmission characteristics as shown in FIG. 4. For a single optical medium inside of the etalon, i.e., in between the reflecting surfaces of the plates 121 and 122, that difference in etalon spacing can be established by a step mirror for one of the etalon plates, as shown.

FIG. 7 now shows a different etalon having two plane parallel plates 221 and 222, but in the first portion of the space in between the plates there is provided an optical medium with an index of refraction N1, and in the second or remaining portion of the etalon spacing of the etalon cavity there is a medium with an index of refraction N2. If the geometric etalon spacing is $d_g$, then $d_1 = d_g N_1$ and $d_2 = d_g N_2$. The two media may, for example, be different transparent solids, for example different glasses, or a gas kept at different pressures. The essential aspect of the split etalon is the establishing of two different optical paths in between the etalon plates, and it is basically immaterial whether this is carried out by way of providing differing geometric paths or by providing similar geometric paths running through media of different optical density.

If the etalon as shown in FIG. 7 is used in a system as shown in FIG. 1, no further problem arises. If, however, the control operation causes the etalon spacing to vary, the choice of the materials used in the etalon spacing is limited, as such material must be compressible, or at least deformable to the extent that the geometric spacing can be varied. The yielding side walls 225 and 226 are schematic representations of this condition. A slidable wall 223 can be inserted in a slot 224 for a variable depth to keep the different media of different index of refraction apart. A control of the geometric spacing $d_g$ of this etalon would be effective as different changes in the optical spacings $d_1$ and $d_2$; this, however, is a second order error.

In case the split etalon is used as output coupler, the wavefront of the beam leaving the etalon is also split, and the corresponding two beams differ by a constant phase. This is completely immaterial as far as the control operation is concerned, but may be undesirable if the two beams are also used together as the principal laser output.

The etalon shown in FIG. 8 establishes three etalon cavities. The main cavity with the spacing $d_0$ covers the main portion of the total aperture of the etalon and defines, together with the mirror 11, the principal laser beam path in the laser cavity. In addition, the etalon defines two small or auxiliary etalon cavities respectively having spacings $d_1$ and $d_2$ defined as aforedescribed. The peak transmission of the main etalon portion with spacing $d_0$ coincides or at least substantially coincides with the frequency $f_0$ at which the transmission characteristics for the split cavities intersect. Thus, in this case, the main portion of the etalon has its peak transmittivity at that mode frequency $f_0$. The control loop stimulated by the light intensities in the auxiliary etalon cavities with spacings $d_1$ and $d_2$, operates to maintain the peak transmittivity of the etalon portion having spacing $d_0$ aligned with the laser mode to be coupled out. This etalon can be used in either one of the laser operation and control loop configurations as shown in FIGS. 1, 5 or 6.

Since the areas of the etalon with the spacings $d_1$ and $d_2$ each are well below half the aperture value of the etalon, the resulting auxiliary etalon resonators have a rather low Q in comparison with the etalon resonator established with the main portion of the etalon having spacing $d_0$. The low Q of the auxiliary etalon cavities widens their response. This is also of advantage as it broadens the total control range covered by the system.

The main etalon portion used to couple out the desired mode covers well over half of the total etalon aperture, and, therefore, the laser resonator operates here with a rather high Q. The wavefront coupled out by this main etalon portion is uniform and has constant phase. The mirrors 131 and 132 facing the auxiliary etalon cavities do not have to be semitransparent, and merely deflect the small portions of the respectively transmitted light passing through the two auxiliary etalons towards the detectors 141 and 142, and the resulting electrical signals are processed in any of the manners aforedescribed.

The invention is not limited to the embodiments described above, but all changes and modifications thereof not constituting departures from the spirit and scope of the invention are intended to be covered by the following claims.

What is claimed is:

1. In combination with a source of monochromatic radiation, emitting such radiation along an optical path, a Fabry-Perot etalon in said optical path having first and second semireflecting surfaces facing each other in a position transverse to the optical path and defining an optical aperture for transmitting radiation having a number of discrete frequencies along the optical path away from said source, the etalon having at least a first and a second portion, the optical distance between said first and second surfaces in the first portion differing from the optical distance between the first and second surfaces in the second portion, the difference of optical distances resulting in two distinct but overlapping frequency dependent transmission bands of the etalon portions for any of the etalon modes;

means for individually detecting the light intensities permitted to pass through the first and second etalon portions;

means for forming a signal representative of the difference of said intensities; and means responsive to said signal for controlling the frequency relation between said monochromatic radiation and said transmission bands for the frequency of said monochromatic radiation to be substantially in between said transmission bands.

2. In the combination as set forth in claim 1, said source of radiation being a laser having a laser-active material in a laser cavity coaxial with said optical path.

3. In the combination as set forth in claim 2 said last mentioned means including means for controlling the length of said laser cavity.

4. In the combination as set forth in claim 1 said last mentioned means including means for controlling the optical distances between said first and second surfaces.

5. In combination with a laser having a pair of reflectors defining a laser cavity, a Fabry-Perot etalon defining one of the reflectors for the laser cavity, the etalon including a first and a second portion, each portion being defined by a pair of reflecting surfaces, the optical distances between the two pairs being different so that one mode of the etalon has a pair of overlapping transmission bands, the optical distances being adjusted so that a single mode of the laser mode frequencies is in between the peaks of the two transmission bands.

6. The combination as set forth in claim 5, the etalon having a third portion defined by a pair of reflecting surfaces defining a transmission band for a third portion of the etalon, the peak of the latter transmission band substantially coinciding with said single mode frequency.

7. The combination as set forth in claim 5, for coupling out and tracking said single mode, comprising a addition, means for individually detecting the intensity radiation of said laser mode through the first and second portions of said etalon;

means for forming a signal representative of the difference in intensities of radiation of said laser mode through the first and second portions of the etalon; and means for adjusting said optical distances in response to said difference.

8. A laser system comprising:

a laser having a cavity defined by a first optical distance between a pair of reflectors, one of said reflectors being a Fabry-Perot etalon having a first portion and a second portion, the optical path length of the first portion being different from the optical path length of the second portion, the difference in optical path lengths resulting in two distinct but overlapping frequency dependent transmission bands, the frequency at which the two transmission bands overlap corresponding to an optical path length equal to the average of the optical path length of each portion of the etalon and defining a second optical distance;

means for detecting the intensity of radiation permitted to pass through each of the first and second portions;

means for forming a signal representative of the difference of said intensities; and means responsive to the signal for controlling one of said first and second optical distances.

9. A system as set forth in claim 8 including means for mode locking the laser.

10. A laser system including a laser active material in between a pair of reflectors defining a laser cavity, one of the reflectors being semitransparent;

a Fabry-Perot etalon positioned to be responsive to at least a portion of the radiation passing through the semitransparent reflector and having a first portion and a second portion, the optical path length of the first portion being different from the optical path length of the second portion, the difference in optical path lengths resulting in two distinct but overlapping frequency dependent transmission bands;

means for detecting the intensity of radiation in each of said transmission bands;

means for forming a signal representative of the difference in the intensity of radiation in each of said transmission bands; and means for controlling the length of said cavity in accordance with said signal.

11. In combination with an active laser material first and second reflector means positioned in relation to the laser material to define a laser cavity;

means for modulating the light in the cavity and inthe optical path between the first and second reflector means;

the first reflector means comprising a Fabry-Perot etalon having first and second reflecting surfaces facing each other, the first surface also defining one reflecting surface for the laser cavity spaced apart from the second reflector means by a first optical distance;

the second surface of the etalon having a first and a second portion respectively spaced apart from the first surface by two different optical distances, together defining a second optical distance value as average for the two different optical distances;

means for individually detecting the intensity of radiation permitted to pass through the first and second portions of the etalon;

means for forming an error signal representative of the difference in the intensity of radiation permitted to pass through the first and second portions of the etalon; and means for adjusting one of said first and second optical distances in response to the error signal.

References Cited

UNITED STATES PATENTS

| | | | |
|---|---|---|---|
| 3,339,073 | 8/1967 | Hunter | 331—94.5 X |
| 3,412,251 | 11/1968 | Hargrove | 331—94.5 X |
| 3,187,270 | 6/1965 | Kogelnik et al. | 331—94.5 |
| 3,243,722 | 3/1966 | Billings | 331—94.5 |
| 3,256,443 | 6/1966 | Moore | 331—94.5 X |

OTHER REFERENCES

Schulz, L. G.: "Accurate Thickness Measurements With A Fabry-Perot Interferometer," JOSA, vol. 40, No. 3, March 1950, pp. 177–178.

Ramsay, J. V.: "Automatic Control of the Spacing of Fabry-Perot Interferometers," Applied Optics, vol. 5, No. 8, August 1966, pp. 1297–1301.

RONALD L. WILBERT, Primary Examiner

T. MAJOR, Assistant Examiner